United States Patent [19]
Gmelin et al.

[11] Patent Number: 5,355,723
[45] Date of Patent: * Oct. 18, 1994

[54] METHOD AND APPARATUS FOR CONTROLLING THE TEMPERATURE OF A HEATED MEASURING RESISTOR

[75] Inventors: Karl Gmelin, Flein; Hans-Peter Stiefel, Ditzingen; Wolfgang Ketterer, Ludwigsburg-Neckarweihingen, all of Fed. Rep. of Germany

[73] Assignee: Robert Bosch GmbH, Stuttgart, Fed. Rep. of Germany

[ * ] Notice: The portion of the term of this patent subsequent to Jun. 25, 2008 has been disclaimed.

[21] Appl. No.: 998,991

[22] Filed: Dec. 31, 1992

Related U.S. Application Data

[63] Continuation of Ser. No. 772,421, Oct. 7, 1991, Pat. No. 5,207,094, which is a continuation of Ser. No. 576,056, Aug. 31, 1990, abandoned.

[30] Foreign Application Priority Data

Sep. 20, 1989 [DE] Fed. Rep. of Germany ....... 3931308

[51] Int. Cl.$^5$ ........................................... G01M 15/00
[52] U.S. Cl. .................................................. 73/118.2
[58] Field of Search .............. 73/118.2, 204.15, 204.16

[56] References Cited

U.S. PATENT DOCUMENTS

| | | | |
|---|---|---|---|
| 4,279,146 | 7/1981 | Wessel et al. | 73/118 |
| 4,373,383 | 2/1983 | Plapp et al. | 73/118 |
| 4,450,719 | 5/1984 | Nishimura et al. | 73/118.2 |
| 5,018,385 | 5/1991 | Frick . | |
| 5,207,094 | 5/1993 | Gmelin et al. | 73/118.2 |

FOREIGN PATENT DOCUMENTS 3309404A 9/1984 Fed. Rep. of Germany .

OTHER PUBLICATIONS

Dr. Ing. Herbert Strickert, "Hitzdraht-& Hitzfilm-manemometrie," [Heated-wire-and Heated-film-manemometry], VEB Verlag Technik, Berlin, Germany, 1974, Section 4.2 (pp. 68–71).

*Primary Examiner*—Robert Raevis
*Attorney, Agent, or Firm*—Frishauf, Holtz, Goodman & Woodward

[57] ABSTRACT

The temperature of a measuring resistor is controlled for measuring the mass flow rate of intake air entering an internal combustion engine. The operating temperature of the measuring resistor is regulated by controlling the level of electric current flowing therethrough. A voltage signal based on the level of electric current flowing through the measuring resistor is generated which is indicative of the mass flow rate of air entering the engine. The operating temperature target value of the measuring resistor is adjusted based on the value of the voltage signal, to optimize the measurement sensitivity thereof based on the level of the intake air mass flow rate.

6 Claims, 2 Drawing Sheets

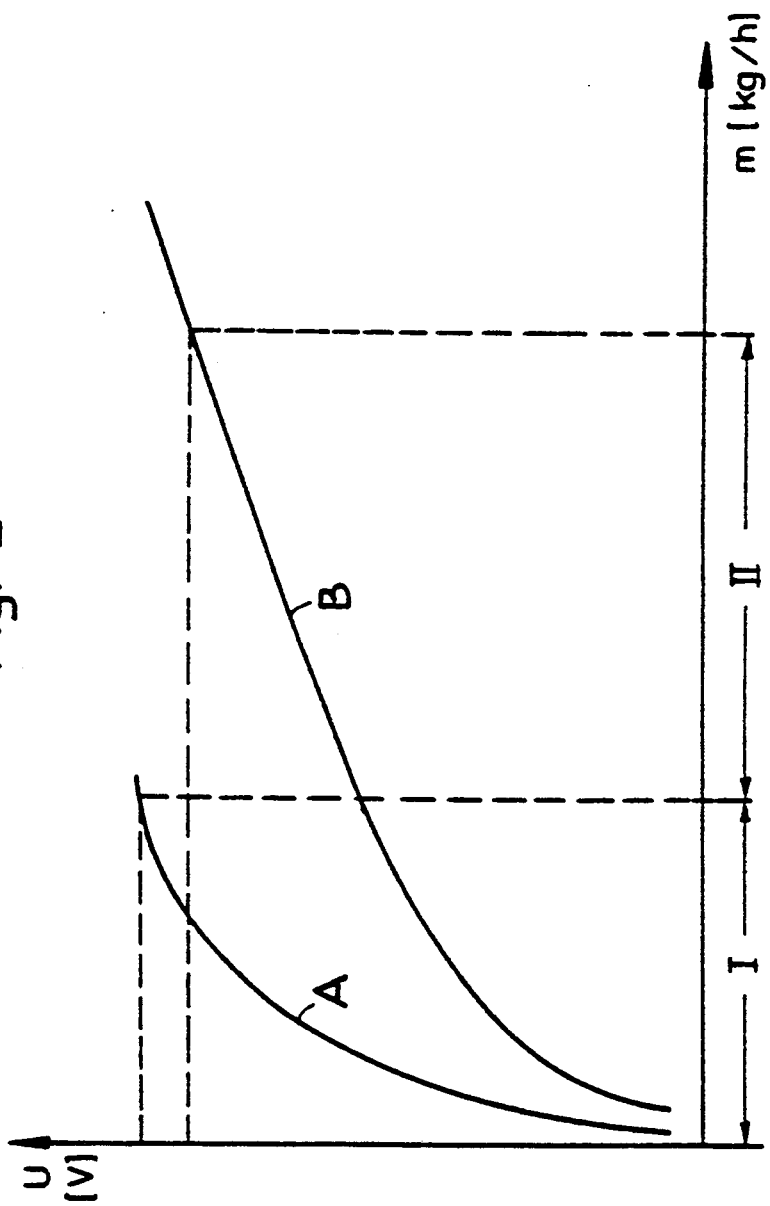

METHOD AND APPARATUS FOR CONTROLLING THE TEMPERATURE OF A HEATED MEASURING RESISTOR

This is a continuation of Ser. No. 772,421, filed Oct. 7, 1991 now U.S. Pat. No. 5,207,094, which was a continuation of Ser. No. 576,056, filed Aug. 31, 1990, now abandoned.

Field of the Invention

The present invention relates to methods and apparatus for controlling the temperatures of measuring resistors and, in particular, to methods and apparatus for controlling the temperatures of measuring resistors for measuring the mass flow rates of intake air entering internal combustion engines.

BACKGROUND INFORMATION

Motor vehicles typically have temperature-controlled measuring resistors to measure the mass flow rate of intake air entering the internal combustion engine. Typically, the measuring resistor is a hot wire or heated film. The intake air flows over the heated wire or film, which is coupled to an electrical bridge circuit. The operating temperature of the measuring resistor is greater than the intake air temperature, and is maintained at a constant level by controlling the level of electric current flowing therethrough.

The level of electric current necessary to heat the measuring resistor corresponds to the mass flow rate of air entering the engine. Typically, the electric current for heating the measuring resistor is converted into a voltage signal. The value of the voltage signal is, accordingly, indicative of the mass flow rate of air entering the engine. Based on the voltage signal, an engine control unit adjusts engine input variables to efficiently operate the engine.

Any contamination on the surface of the hot wire or film decreases the measurement sensitivity thereof. Therefore, after the engine is turned off, the wire or film is heated to a red-hot temperature by increasing the level of electric current flowing therethrough. Any contaminants on the wire or film are thus burned away.

One problem with known methods and apparatus for measuring the mass flow rate of intake air entering an engine, is that an optimum degree of measurement sensitivity cannot be attained over the entire range of air mass flow rates encountered during operation of the engine. The operating temperature of the measuring resistor is typically maintained at one level or target value. Ordinarily, that level does not provide an optimum degree of measurement sensitivity over the entire range of intake air mass flow rates encountered in the operation of the engine. For example, the degree of measurement sensitivity provided during full load operation of the engine is ordinarily insufficient to accurately measure the air mass flow rates at low load operational modes. As a result, the measurements of the air mass flow rates are typically not as accurate as desired over the entire operational range of an engine.

It is an object of the present invention, therefore, to provide a method and apparatus for measuring the mass flow rate of air entering an internal combustion engine that provides optimum degrees of measurement sensitivity over the entire range of intake air mass flow rates encountered during operation of the engine.

SUMMARY OF THE INVENTION

The present invention is directed to a method of controlling the temperature of a measuring resistor for measuring the mass flow rate of air entering an internal combustion engine. The method comprises the following steps:

regulating the operating temperature of the measuring resistor by controlling the level of electric current flowing therethrough;

generating output signals indicative of the mass flow rate of air entering the engine based on the level of electric current flowing through the measuring resistor;

measuring at least one engine reference variable, wherein changes in the value of the reference variable correspond to changes in the mass flow rate of air entering the engine; and adjusting the operating temperature of the measuring resistor based on the value of the reference variable by adjusting the level of electric current flowing therethrough, to optimize the measurement sensitivity thereof based on the level of the intake air mass flow rate.

The operating temperature target value of the measuring resistor is preferably adjusted in response to the value of the reference variable traversing at least one predetermined value. If the reference variable falls below the predetermined value, thus indicating a decrease in the mass flow rate of intake air, the operating temperature target value of the measuring resistor is increased to optimize the measurement sensitivity within a first range of intake air mass flow rates. If, on the other hand, the reference variable increases in value above the predetermined value, thus indicating an increase in the intake air mass flow rate, the operating temperature target value of the measuring resistor is decreased to optimize the measurement sensitivity within a second range of intake air mass flow rates.

In one method of the present invention, the reference variable is a voltage signal corresponding to the level of electric current flowing through the measuring resistor. In another method of the present invention, the reference variable is selected from a group including the rotational frequency of the engine, and the angle of the throttle valve of the engine.

The present invention is also directed to an apparatus for measuring the mass flow rate of intake air entering an internal combustion engine. The apparatus comprises a measuring resistor supported within the engine so that the intake air entering the engine flows over the measuring resistor. The apparatus also comprises means coupled to the measuring resistor for adjusting the operating temperature target value thereof, based on the value of at least one reference variable. The operating temperature of the measuring resistor is adjusted by regulating the level of electric current flowing therethrough. The reference variable is selected so that changes in its value correspond to changes in the mass flow rate of air entering the engine. The operating temperature target value of the measuring resistor is therefore adjusted to optimize the measurement sensitivity of the apparatus based on the level of the intake air mass flow rate.

In one apparatus of the present invention, the means for adjusting changes the operating temperature of the measuring resistor in response to the value of the reference variable traversing at least one predetermined value. If the reference variable falls below the predetermined value, thus indicating a decrease in the mass flow rate of intake air, the operating temperature of the measuring resistor is increased to optimize the measurement sensitivity of the apparatus within a first range of intake air mass flow rates. If, on the other hand, the reference variable increases in value above the predetermined value, thus indicating an increase in the intake air mass flow rate, the operating temperature of the measuring resistor is decreased to optimize the measurement sensitivity of the apparatus within a second range of intake air mass flow rates.

The means for adjusting preferably comprises a bridge circuit. The measuring resistor is coupled to a first arm of the bridge circuit, and a temperature-dependent resistor is coupled to a second arm of the bridge circuit. The temperature-dependent resistor is supported within the engine so that the intake air flows over the temperature-dependent resistor. The resistance value of the temperature-dependent resistor is, accordingly, dependent on the intake air temperature. The second arm of the bridge circuit further includes a rheostat coupled in series with the temperature-dependent resistor. The resistance value of the rheostat is adjustable to regulate the level of electric current flowing through the measuring resistor.

The means for adjusting further comprises an amplifier. A first input of the amplifier is coupled to the first arm of the bridge circuit. A second input of the amplifier is coupled to the second arm of the bridge circuit. The output of the amplifier is coupled to the measuring resistor and the temperature-dependent resistor. The amplifier in turn controls the level of electric current flowing through the measuring resistor in response to the input from the first arm and second arm of the bridge circuit.

The apparatus further comprises a first terminal coupled to the output of the amplifier. A second terminal is coupled to the first arm and the second arm of the bridge circuit and to ground. The voltage across the first and second terminals is indicative of the mass flow rate of air entering the engine. A control unit is coupled to the first and second terminals and to the rheostat. The control unit receives input signals indicative of the voltage across the first and second terminals. The control unit in turn adjusts the rheostat in response to the input signals to control the level of electric current flowing through the measuring resistor and, thus, the operating temperature thereof.

The first arm of the bridge circuit preferably further includes a first resistor coupled between the measuring resistor and the second terminal. The first input of the amplifier is coupled between the measuring resistor and the first resistor. The second arm of the bridge circuit further includes a second resistor coupled between the temperature-dependent resistor and the rheostat. The second input of the amplifier is coupled between the second resistor and the rheostat.

One advantage of the apparatus and method of the present invention, is that a high degree of measurement sensitivity is provided, particularly in the no-load and partial-load ranges when the mass flow rate of air entering the engine is at its lowest levels. This feature of the present invention is particularly important when the air mass flow rate meter has a bypass configuration.

Another advantage of the apparatus and method of the present invention, is that because the operating temperature of the measuring resistor is adjusted during the measuring operation, the measurement sensitivity is optimized within particular ranges of intake air mass flow rates. Thus, the measurement sensitivity can be optimized throughout the entire range of intake air mass flow rates encountered in the operation of an engine, by adjusting the operating temperature of the measuring resistor to optimize the measurement sensitivity in particular ranges within the entire range. For example, the measurement sensitivity can be increased during low load operational modes of the engine and decreased during high load operational modes, thus optimizing the measurement sensitivity throughout the entire range of operational modes of the engine.

A high operating temperature of the measuring resistor increases the voltage range indicative of the intake air mass flow rate. Thus, even when the air-mass flow rate is only modified slightly, the value of the voltage signal indicative thereof changes sufficiently to accurately measure the change. When the operating temperature of the measuring resistor is decreased, a larger range of air mass flow rates can be measured. Therefore, in accordance with the present invention, an operating temperature target value is selected to attain a corresponding optimum measuring result. Thus, high resolution measurements can be attained in no-load, partial-load, and full-load operational modes of an engine.

Other advantages of the method and apparatus of the present invention will become apparent in view of the following detailed description and drawings taken in connection therewith.

BRIEF DESCRIPTION OF THE DRAWINGS

FIG. 2 is a diagram illustrating the measuring voltage generated by the apparatus of FIG. 1, which is indicative of the mass flow rate of air entering a typical internal combustion engine.

DETAILED DESCRIPTION

Figure 1:
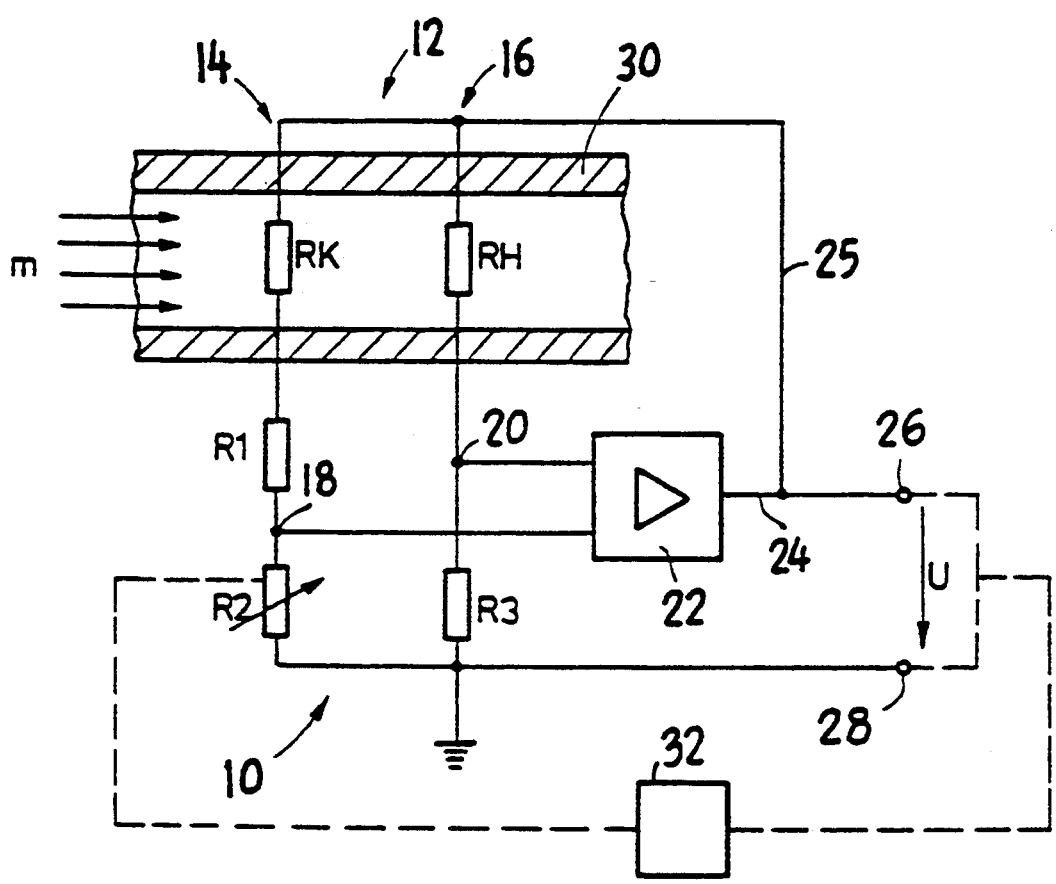
FIG. 1 is a schematic illustration of an apparatus embodying the present invention.

In FIG. 1, an apparatus embodying the present invention is indicated generally by the reference numeral 10. The apparatus 10 is a hot wire type meter for detecting the mass flow rate of air entering an internal combustion engine in a motor vehicle (not shown). The apparatus 10 includes a bridge circuit, indicated generally by the reference numeral 12. The bridge circuit 12 includes a first bridge arm 14 and a second bridge am 16, which are coupled to each other to form a voltage divider, as shown in FIG. 1.

The bridge arm 14 includes a temperature-dependent resistor RK coupled in series with a first resistor R1 and a rheostat R2. The resistance of the resistor RK varies depending upon the ambient temperature thereof. The resistance of the rheostat R2, on the other hand, can be adjusted as desired, as described further below. The bridge am 16 includes a measuring resistor RH coupled in series with a second resistor R3. The measuring resistor RH is the hot wire of the apparatus 10.

A first voltage tap 18 is coupled on one end between the first resistor R1 and the rheostat R2, and is coupled on the other end to a first input of an operational amplifier 22. A second voltage tap 20 is coupled on one end between the measuring resistor RH and the second resistor R3, and coupled on the other end to a second input of the operational amplifier 22. The output 24 of the operational amplifier 22 is coupled to a first terminal 26, and to the measuring resistor RH and resistor RK by a line 25. A second terminal 28 is coupled to the second resistor R3 and the rheostat R2, and each is in turn coupled to ground.

The measuring resistor (or hot wire) RH and the resistor RK are supported within an air intake conduit 30 of an internal combustion engine (not shown). The direction of air flow through the conduit 30 is indicated by the arrows in FIG. 1. The mass flow rate of air (m) into the engine is typically measured in kg/hr. As described below, the level of the voltage U across the first terminal 26 and second terminal 28 corresponds to the mass flow rate of air (m) in the intake conduit 30.

A control unit 32, of a type known to those skilled in the art, is coupled to the first terminal 26 and second terminal 28, and to the rheostat R2. Based on the voltage U across the terminals 26 and 28 (the measuring voltage), the control unit 32 regulates the current flowing through the measuring resistor RH by adjusting the resistance of the rheostat R2. The temperature of the measuring resistor RH is, accordingly, adjusted to optimize the measurement sensitivity of the apparatus 10 depending on the magnitude of the mass flow rate of air the intake conduit 30, as hereinafter described.

In the operation of the apparatus and method of the present invention, the measuring resistor RH is heated to an operating temperature $T_B$. Because the air flowing through the intake conduit 30 is at a temperature lower than the operating temperature $T_B$, the air tends to decrease the temperature of the measuring resistor RH. The decrease in temperature of the measuring resistor RH causes a change in its resistance value and, in turn, a bridge unbalance. However, based on the change in the resistance of the measuring resistor RH, the operational amplifier 22 adjusts its output 24 over the line 25, to correspondingly increase the level of current flowing therethrough. The increase in electric current causes the measuring resistor RH to maintain a desired operating temperature target value $T_B$.

The voltage U across the first terminal 26 and the second terminal 28 corresponds to the mass flow rate of air (m) and is, accordingly, the measuring result of the apparatus 10. The output 24 of the operational amplifier 22 is based on the inputs from the first bridge arm 14 and the second bridge arm 16. And the resistance value of the resistor RK corresponds to fluctuations in the temperature of the intake air flowing through the intake conduit 30. The resistor RK, therefore, prevents variations in the temperature of the intake air from influencing the measuring voltage U or, that is, the measuring result of the apparatus 10.

In the operation of the apparatus 10, the control unit 32 adjusts the resistance value of the rheostat R2 based on the value of the measuring voltage U to, in turn, regulate the operating temperature $T_B$ of the measuring resistor RH. In accordance with the present invention, when the mass flow rate of air (m) is relatively low, the control unit 32 adjusts the rheostat R2 so that the operating temperature $T_B$ of the measuring resistor RH is raised to a higher level. As a result, the magnitude of the fluctuations in the measuring voltage U in response to fluctuations in the mass flow rate of air (m) is correspondingly increased. Thus, the measurement sensitivity of the apparatus 10 is optimized to more accurately measure the relatively low mass flow rates of air (m). Although the measuring range of the apparatus 10 achieved by increasing the operating temperature $T_B$ is decreased (i.e., the range of air mass flow rates (m) that can be measured), the apparatus is able to perform sensitive measurements within that range. In any event, once the air mass flow rates (m) approach the outer limits of the measuring range, the apparatus 10 is adjusted to optimally measure a new range of air mass flow rates.

Accordingly, when the value of the measuring voltage U indicates that a predetermined mass flow rate of air (m) is exceeded during the measuring operation, the control unit 32 adjusts the rheostat R2 to decrease the operating temperature $T_B$ of the measuring resistor RH. As a result, the magnitude of the fluctuations in the measuring voltage U is decreased for corresponding changes in the mass flow rate of air (m). The measuring range of the apparatus 10 is, accordingly, expanded, because the measuring voltage U is apportioned over a larger range of air mass flow rates (m).

Therefore, in accordance with the present invention, the operating temperature $T_B$ of the measuring resistor RH is adjusted during the measuring operation of the apparatus 10. As a result, there is a corresponding optimization the measurement sensitivity of the apparatus 10, which is substantially better than if the operating temperature $T_B$ of the measuring resistor RH were maintained at one level, as with prior art devices.

In FIG. 2, the measuring voltage U generated by the apparatus 10 is plotted as a function of the mass flow rate of air (m) entering the intake conduit 30 of a typical internal combustion engine. The characteristic curve A corresponds to a higher operating temperature $T_B$ for the measuring resistor RH, in comparison to the characteristic curve B, which corresponds to a lower operating temperature $T_B$. Therefore, in range I, which includes relatively low flow rates, such as during zero-load or partial-load operation of the engine, the operating temperature $T_B$ is increased. As a result, the magnitude of a change in the measuring voltage U corresponding to a change in the mass flow rate of air (m) is correspondingly increased in comparison to the range II. Accordingly, as can be seen, the slope of the characteristic curve A is greater than the slope of the characteristic curve B. The measurement sensitivity of the apparatus 10 is, therefore, increased within the air mass flow rate range I.

However, if the mass flow rate of air (m) exceeds a predetermined threshold level, which corresponds to a predetermined threshold value of the measuring voltage U, then the apparatus 10 is adjusted to operate in accordance with the characteristic curve B, as hereinafter described.

In the operation of the apparatus 10 in accordance with the characteristic curve B, the measuring voltage U is apportioned over the larger range II of air mass flow rates (m). As described above, the slope of the curve B is less than the slope of the characteristic curve A. In the higher mass flow rate range II, it is desirable to decrease the measurement sensitivity of the apparatus 10, since the magnitude of the fluctuations in the air mass flow rate are typically greater than in range I. Therefore, by operating the apparatus 10 pursuant to the characteristic curve B in range II, the occurrence of dramatic surges in the measuring voltage U is avoided. Accordingly, the measurement sensitivity of the apparatus 10 is optimized depending upon the level of the intake air mass flow rate (m).

The conversion of the apparatus 10 from operation in accordance with characteristic curve A to characteristic curve B is based on the magnitude of the measuring voltage U. In response to the value of the measuring voltage U, the control unit 32 adjusts the rheostat R2, in a manner within the knowledge of those skilled in the art, to regulate the level of electric current flowing through the measuring resistor RH and, thus, the operating temperature $T_B$ thereof.

Although in the embodiment of the present invention described, the operating temperature $T_B$ of the measuring resistor RH is changed when the mass flow rate of air (m) exceeds a single predetermined threshold value, the change can be performed in a more continuous manner, as will be recognized by those skilled in the art. For example, several threshold values can be set, and the apparatus 10 can operate in accordance with several corresponding characteristic curves. Each characteristic curve corresponds to a particular range of air mass flow rates (m). As a result, the apparatus 10 can more smoothly adjust the operating temperature $T_B$ to vary and, in turn, optimize its measurement sensitivity over the entire range of air mass flow rates (m) encountered in the operation of an internal combustion engine.

It should also be pointed out that the operating temperature $T_B$ of the measuring resistor RH can be adjusted based on the value of a specific reference variable G indicative of the intake air mass flow rate (m), other than the measuring voltage U. For example, the rotational frequency of the engine can be measured and output signals can be generated that are indicative thereof. In response to the output signals, the control unit 32 determines whether the rotational frequency (or output signal indicative thereof) exceeds (or falls below) a predetermined threshold value. If so, the control unit 32 correspondingly adjusts the rheostat R2 to control the operational temperature $T_B$ of the measuring resistor RH.

The angle of the throttle valve of the engine can likewise be measured and, in turn, used as the reference variable G. In response to output signals indicative of the angle, the control unit 32 determines if the angle exceeds (or falls below) a predetermined threshold value. If so, the control unit 32 adjusts the rheostat R2 to correspondingly adjust the operating temperature $T_B$ of the measuring resistor RH.

The specific manner in which the rheostat R2 is adjusted is within the knowledge of those skilled in the art. It is simply necessary that its resistance value be adjusted based on a corresponding modification of the reference variable G. And, as described above, the adjustment of the rheostat R2 can be performed gradually, i.e., when a single predetermined threshold value is exceeded, or it can be performed in a more continuous manner by setting a plurality of predetermined threshold values, and adjusting the rheostat when each respective threshold value is traversed.

In accordance with the present invention, the operating temperature of the measuring resistor RH is varied during the measuring operation of the apparatus 10. The operating temperature $T_B$ is changed based on an evaluation of the measuring result of the apparatus 10. A change in the value of the reference variable G does not necessarily lead to a change in the operating temperature $T_B$ of the measuring resistor RH, but rather leads to a corresponding change in the evaluation of the measuring result.

We claim:

1. A method of controlling the temperature of a measuring resistor for measuring the mass flow rate of air entering an internal combustion engine, comprising the following steps:

maintaining said measuring resistor at an operating temperature target value by controlling the level of electrical current flowing therethrough;

generating an output signal indicative of the mass flow rate of air entering the engine based on the level of electric current flowing through the measuring resistor;

measuring at least one engine reference variable, wherein changes in the value of the reference variable correspond to changes in the mass flow rate of air entering the engine; and adjusting said operating temperature target value of the measuring resistor to one of a plurality of preselected values, each preselected value (A, B) corresponding to one of a plurality of ranges (I, II) of said air mass flow rate, to thereby provide a desired degree of measurement sensitivity in a range which includes the mass flow rate value indicated by said output signal.

2. A method as defined in claim 1, wherein the operating temperature target value is adjusted in response to the value of the reference variable traversing at least one predetermined value, such that if the reference variable falls below said predetermined value, thus indicating a decrease in the air mass flow rate, the operating temperature target value is increased to optimize the measurement sensitivity within a first range (I) of air mass flow rates, and if the reference variable exceeds said predetermined value, thus indicating an increase in the air mass flow rate, the operating temperature target value is decreased to optimize the measurement sensitivity within a second range (II) of air mass flow rates.

3. A method as defined in claim 2, wherein
    the reference variable is a voltage signal corresponding to the level of electric current flowing through the measuring resistor.

4. A method as defined in claim 2, wherein the reference variable is selected from a group including:
    (i) the rotational frequency of the engine, and
    (ii) the angle of the throttle valve of the engine.

5. An apparatus for measuring the mass flow rate of air entering an internal combustion engine, comprising:
    a measuring resistor supported within the engine so that intake air entering the engine flows over the measuring resistor, the operating temperature of the measuring resistor being maintained at a target value by controlling the level of electric current flowing therethrough; and means, coupled to the measuring resistor, for selecting an appropriate operating temperature target value thereof, based on the value of at least one reference variable, wherein changes in the value of the reference variable correspond to changes in the mass flow rate of air entering the engine, thereby selecting an appropriate the measuring sensitivity of the apparatus, based on the level of the air mass flow rate.

6. An apparatus as defined in claim 5, wherein the means for selecting a target value changes the operating temperature target value of the measuring resistor in response to the value of the reference variable traversing at least one predetermined value, such that if the reference variable falls below said predetermined value, thus indicating a decrease in the mass flow rate, the operating temperature target value is increased to optimize the measurement sensitivity within a first range (I) of air mass flow rates, and if the reference variable exceeds said predetermined value, thus indicating an increase in the mass flow rate, the operating temperature target value is decreased to optimize the measurement sensitivity within a second range (II) of air mass flow rates.

* * * * *